Figure 3:
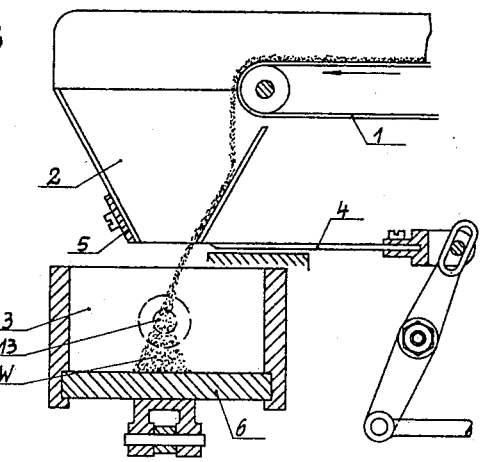
Figure 4:
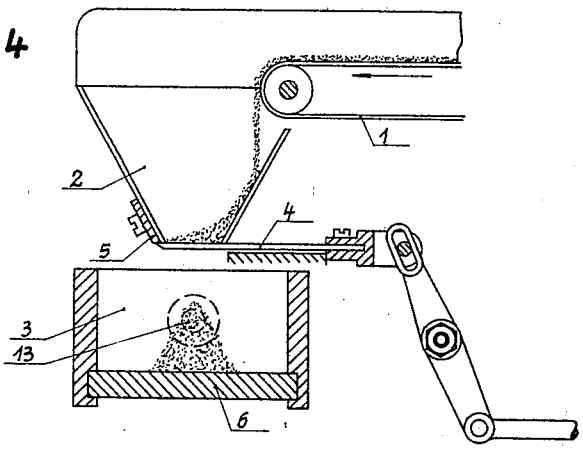
Figure 5:
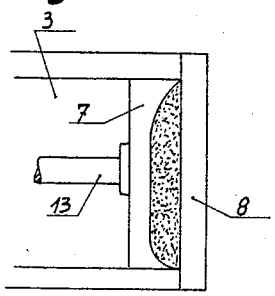

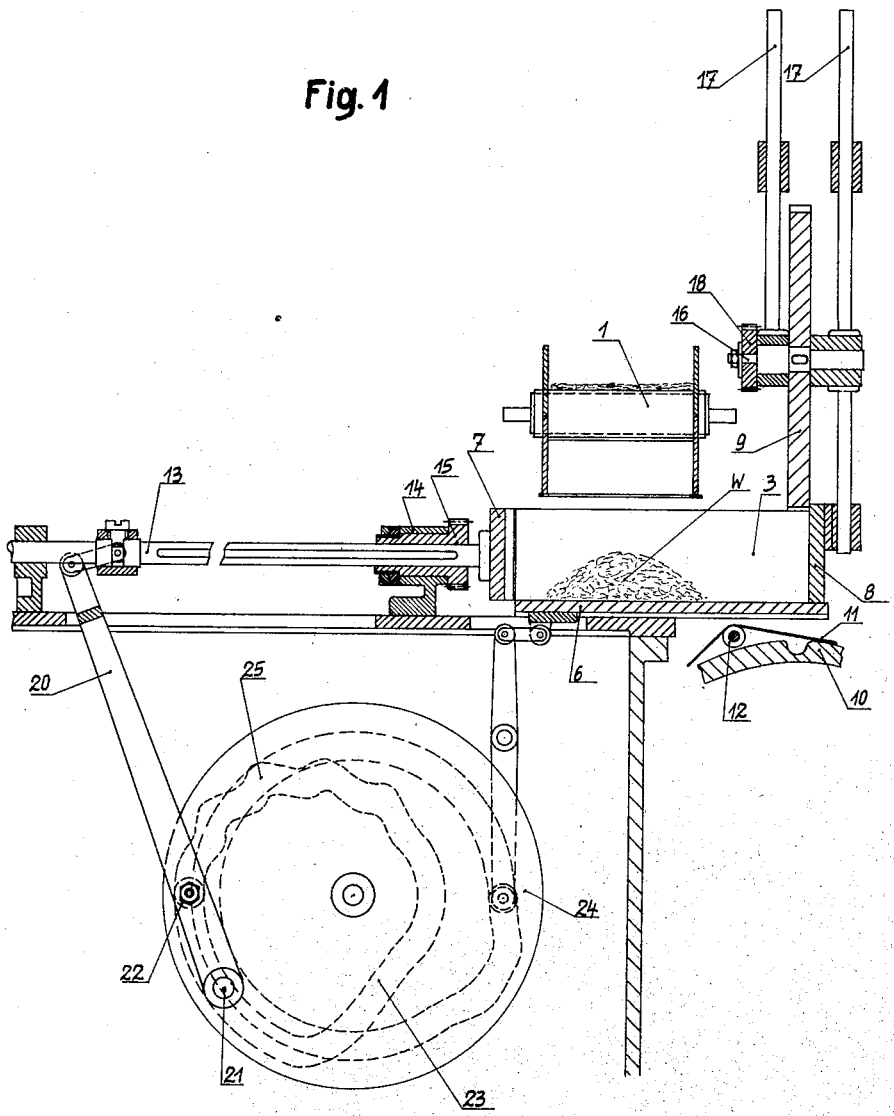

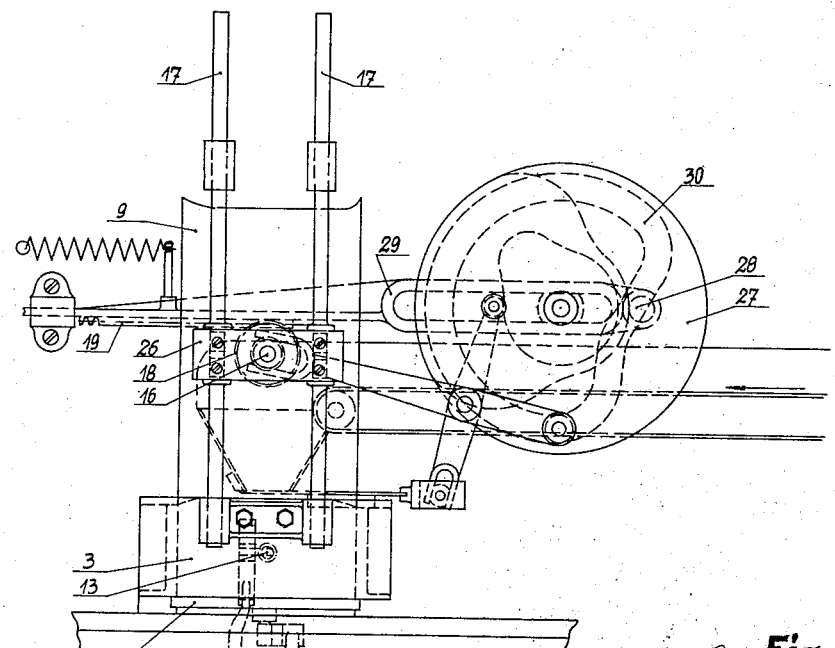
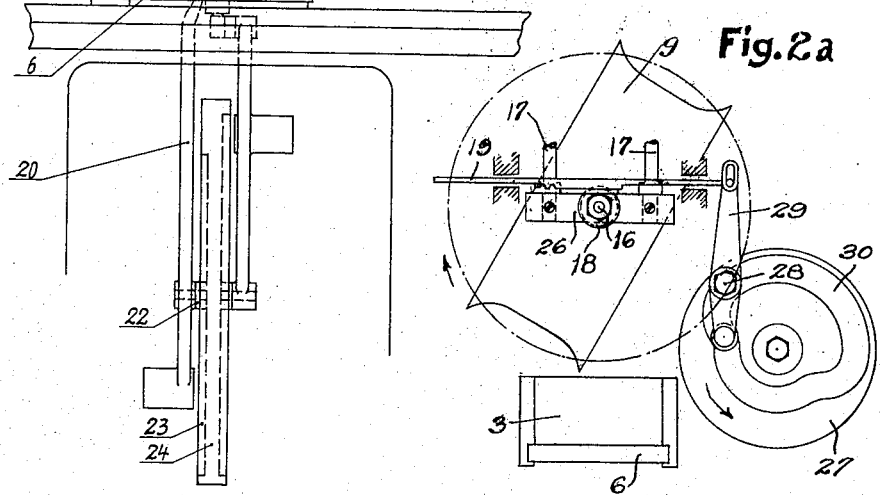

Aug. 2, 1932.   F. H. B. STELZER   1,869,396
METHOD OF PRODUCING CIGAR FILLERS BY ARRANGING THE TOBACCO
FROM WHICH THEY ARE TO BE MADE BETWEEN PROFILED DIES
Filed Aug. 23, 1929   4 Sheets-Sheet 3

Inventor
Franz Heinrich Benno Stelzer
by Max D. Ordmann
Atty.

Aug. 2, 1932.   F. H. B. STELZER   1,869,396
METHOD OF PRODUCING CIGAR FILLERS BY ARRANGING THE TOBACCO
FROM WHICH THEY ARE TO BE MADE BETWEEN PROFILED DIES
Filed Aug. 23, 1929   4 Sheets-Sheet 4
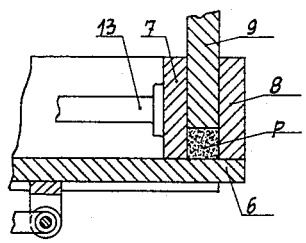
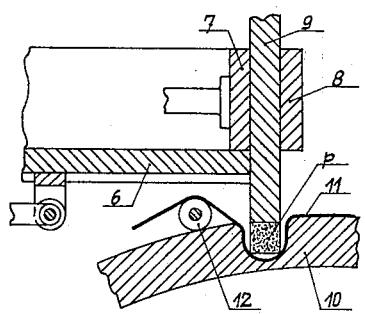
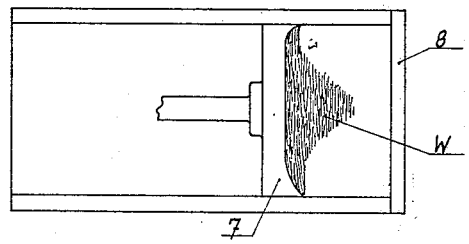
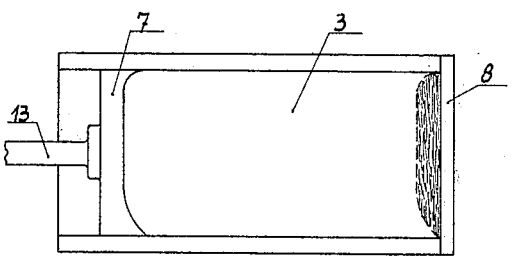
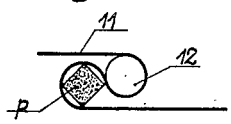
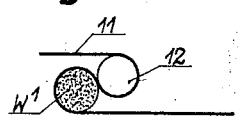
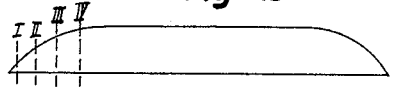

Patented Aug. 2, 1932

1,869,396

UNITED STATES PATENT OFFICE

FRANZ HEINRICH BENNO STELZER, OF DRESDEN, GERMANY, ASSIGNOR TO THE FIRM JOHANN CARL MULLER, OF DRESDEN, GERMANY

METHOD OF PRODUCING CIGAR FILLERS BY ARRANGING THE TOBACCO FROM WHICH THEY ARE TO BE MADE BETWEEN PROFILED DIES

Application filed August 23, 1929, Serial No. 387,877, and in Germany September 1, 1928.

The present invention relates to a method of producing cigar fillers by arranging the tobacco from which they are to be made between profiled dies.

Under the known processes the amount of cut tobacco required to form a filler is placed on a support or into a channel and pushed by a die having a concave working surface against an abutment in order to acquire the shape of a cigar. Moreover, it has been proposed to employ two working dies operating in intersecting directions for the purpose of perfecting the shape as much as possible. The invention consists now in placing the amount of cut tobacco required for forming a filler in the form of a low wall or layer on the bottom of the open shaping channel so that the longitudinal direction of the layer coincides with that of the channel, whereupon the layer of tobacco is moved forward and pressed against the ends of the channel serving as abutment by means of a die adapted to be displaced in the longitudinal direction of the layer, and a second die provided also with a concave working surface and adapted to be moved rectangularly to the first die comes in contact with the compressed tobacco to impart to it the final shape.

As soon as the die engages the layer or wall of tobacco, the structure of the layer is destroyed and the main portion of the tobacco pushed forward in front of the center of the die while the rest of the tobacco is moved towards the sides. If the layer of tobacco has been dimensioned correctly and the die moves at the proper speed, it will be found that when the die reaches its final position the amount of tobacco that has travelled towards the side walls of the channel represents the exact quantity required for the two tapering ends of the filler to insure the same density of arrangement as in the main portion of the filler, that is, a density that will permit uniform draft and combustion when the cigar is finished.

The second die adapted to be displaced perpendicularly to the first die and to engage the tobacco compressed by the latter cooperates in the final shaping of the tobacco intended to form the filler, but plays only a secondary part compared with the work to be done by the first die.

If relatively coarse tobacco is to be used comprising broad strips, the latter, which are arranged more or less obliquely in the longitudinal direction of the layer, will be brought into a position, owing to the forward motion of the die, that their longitudinal direction extends transversely to the feeding motion of the die. Such an arrangement, however, interferes with the proper distribution of the tobacco, because the ends of the transversely positioned strips will be pressed together at the ends of the prepared or bunched filler so that uniform density no longer prevails.

This drawback can be eliminated by imparting to the profiled die during its working stroke a shaking motion so as to move it to and fro in the feeding direction. Although this shaking motion will not prevent the broad strips of coarse tobacco from occupying a transverse position, it will nevertheless cause the strips to be graded in front of the die.

The original layer of tobacco may be formed in various ways but preferably so that the tobacco drops from a fleece on to a support, i. e., the bottom of a channel, and the supply is interrupted periodically, that is, when the quantity required for a filler has accumulated.

The accompanying drawings illustrate a machine for carrying out the method described. Figure 1 is a side view of the parts wherein the invention resides; Fig. 2, a view of Fig. 1 seen in the direction of the arrow A; Fig. 2a, a view of a modification; Figs. 3 to 8 show the successive working positions of the filler pressing device; Figs. 9 and 10, the mode of operation of the pressing device in case of coarse tobacco; Figs. 11 and 12, the mode of operation of the bunching device, the latter figures being diagrams; and Figs. 13 and 13a illustrate in front and side elevation the final filler shape.

Figure 6:
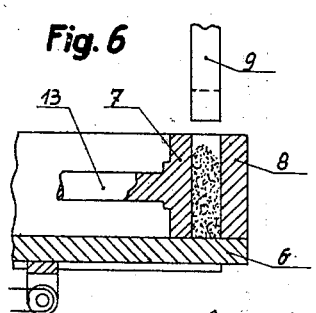

Referring to the drawings, the tobacco drops from the conveyor 1 through the hopper 2 into the box 3, the hopper being closed at regular intervals by the controlled slide 4, which fulfills the function of a cutter and cooperates with the cutter 5 like shears in order to separate obstructing tobacco parts. On the movable bottom 6 of the box 3 the tobacco layer $w$, Fig. 1, is thus built up from time to time, and during the periods when the hopper 2 is shut off the horizontally movable die 7 corresponding to the inside breadth of the box advances in the longitudinal direction of the layer $w$. The working surface of the die 7 has an unsymmetrically concave form corresponding to the shape of the filler to be produced and, together with the wall 8 of the box, constitutes the mold for the die 9 having a correspondingly concave working surface and acting vertically. (Fig. 6.) The tobacco forming originally the layer $w$ is pushed into the chamber or mold thus created and, simultaneously, slightly pressed horizontally, so that on the descent of the die 9 (Fig. 7) the tobacco is pressed into the shape $p$ with tapering ends but of uniform square cross section, as shown in Fig. 13, whereupon the bottom 6 is drawn back far enough to permit the die 9 to continue its downward motion and eject the formed tobacco $p$ from the box (Fig. 8). Underneath the box 3 the curved table 10 with the cloth 11 are arranged on which the roll 12 acts in the usual manner. The die 9 drives the shaped tobacco $p$ into the trough of the table where it is covered with the cloth by the roll 12 and made into a filler ready for further treatment by being rolled on the cloth (Figs. 11 and 12), its originally angular form with its one-sided tapered ends being rounded off and converted into the filler W1 which is symmetrical relative to its longitudinal axis. The roll is concave corresponding to the final shape of the filler.

In the interest of the economical further treatment of the fillers it is essential to have their tapered end point alternately to different sides, which is achieved by causing the dies 7 and 9 to be turned 180° prior to each working stroke. In the modification shown in die 7, which has only one working surface, is turned about its stem 13. For this purpose the round stem capable of displacement in the slide bearing 14 is coupled by slot and key with the toothed wheel 15 held in the slide bearing, which is turned 180° prior to each working stroke. The die 9 is provided with two working surfaces and swings about a pin 16 in its longitudinal center, the pin 16 being secured to a cross bar 26 connecting the bars 17 which move the die up and down. Whenever the die reaches its uppermost dead point, a cog wheel 18 arranged on the pin 16 engages a rack 19 which is oscillated by means of the cam 27 and the double-armed lever 29 positioned at 28. The curve 30 of the cam 27 is made so that the rack 19 turns the die 9 alternately 180° in either direction.

The change in the direction of the dies brings about a corresponding change in the motion of the roll 12.

The die 7 is moved forward by the connecting rod 13 articulated to a lever 20 which swings about the pin 21. The lever is provided with a pin 22 fitted with rolls, and this pin engages the groove 23 of a cam 24, the groove being partly covered with the undulations 25 which cause the die 7 to be shaken so that during the working stroke it is guided to and fro by short jerks in the feeding direction. The cam 24 having the undulations 25 may be replaced by a cam without undulations if fine-cut tobacco only is to be worked to the total exclusion of coarser kinds.

I claim:—

1. Apparatus for producing cigar fillers comprising in combination a shaping box, a movable bottom forming part of the said box, means for depositing tobacco in a pile on said bottom in the longitudinal direction of the said box, a die having a concave working surface and being displaceable horizontally relative to the direction of the said pile to press the tobacco against the wall of the said box, the said die and the said wall forming a mold for the tobacco, a second die movable in vertical direction and having a concave working surface to cooperate in pressing the tobacco into shape, a rolling table positioned under the said box, a trough arranged in the said table, and a rolling cloth on the said table, the tobacco being driven into the said trough by the said vertically movable die on its descent after the said movable bottom has been drawn back.

2. In apparatus according to claim 1, in which means are provided for moving the said dies a predetermined degree between every two operations to cause the pressed units to face alternately different sides with their more pointed end.

3. In apparatus according to claim 1, in which said first named die has a connecting rod for moving the said die, a control lever adapted to engage the said rod, and an undulated cam adapted to move the said lever.

4. A method of producing cigar fillers comprising the steps of depositing tobacco in a pile having a greater length than width, then pushing and oscillating said pile in the direction of its length to uniformly redistribute the latter into a shape approximating the final cigar shape and then forming said redistributed pile into the final cigar shape.

5. A method of producing cigar fillers comprising the steps of depositing tobacco in a pile having a greater length than width, then pushing said pile forwardly in the direction of its length to uniformly redistribute the latter into a shape approximating the final cigar shape, then compressing said redistributed pile and then forming the latter into final shape.

6. A method of producing cigar fillers comprising the steps of depositing tobacco in a pile having a greater length than width on a table, then pushing said pile in the direction of its length to uniformly redistribute said pile into a shape approximating the final cigar shape in a direction at right angles to the direction of movement of said pile, then compressing said redistributed pile and then forming the latter into final shape.

7. A method of producing cigar fillers comprising the steps of depositing tobacco in a pile having a greater length than width, then pushing said pile in the direction of its length to uniformly redistribute the latter into a shape approximating the final cigar shape and compressing it in said shape, then further compressing said shaped pile in a second direction and then rolling said shaped compressed pile into final cigar shape.

8. A method of producing cigar fillers comprising the steps of depositing tobacco in a pile having a greater length than width, then pushing said pile in the direction of its length to uniformly redistribute the latter into a shape approximating the final cigar shape and compress it into said shape, then further compressing said shaped pile in a direction at right angles to said first named compression and then rolling said shaped compressed pile into final cigar shape.

9. An apparatus for producing cigar fillers comprising a shaping box having greater length than width, a movable bottom forming part of the said box, hopper means having an opening having greater length than width and whose length extends in the same direction as said box length for depositing tobacco in a pile in said box so that the longitudinal axis of said pile coincides with the length of said box, pushing means having a concave working surface and being displaceable along the bottom of said box in the direction of its length to redistribute said pile into approximate final cigar shape and to then press said redistributed tobacco against the rear wall of said box, compressing means movable in a direction at an angle to said pushing means to compress said redistributed tobacco in a second direction, and rolling means to which said compressed filler is transferred by said compressing means for formation into final cigar shape.

10. An apparatus for producing a cigar filler, comprising a mold having a movable bottom, said mold having a greater length than width, a horizontally operable concave die adapted to coperate with the end wall of said mold, hopper means having an opening having greater length than width and whose length extends in the same direction as said mold length for distributing cut tobacco on the bottom of said mold in form of a pile whose longitudinal middle axis coincides with the mold length, so that when said die is moved forwardly through said mold the main mass of the tobacco will be pushed forward and a sufficient quantity of the lateral parts of the tobacco pile will be swept toward the sides of said mold to produce at the reduced ends of the cigar filler the required density, and means for compressing said filler and forming it into final shape.

In testimony whereof I affix my signature.

FRANZ HEINRICH BENNO STELZER.